Sept. 19, 1933.  R. W. PITMAN  1,927,789
CONTROLLING AND ACTUATING MECHANISM FOR MOTOR VEHICLE TRANSMISSIONS
Filed Jan. 13, 1932  2 Sheets-Sheet 1
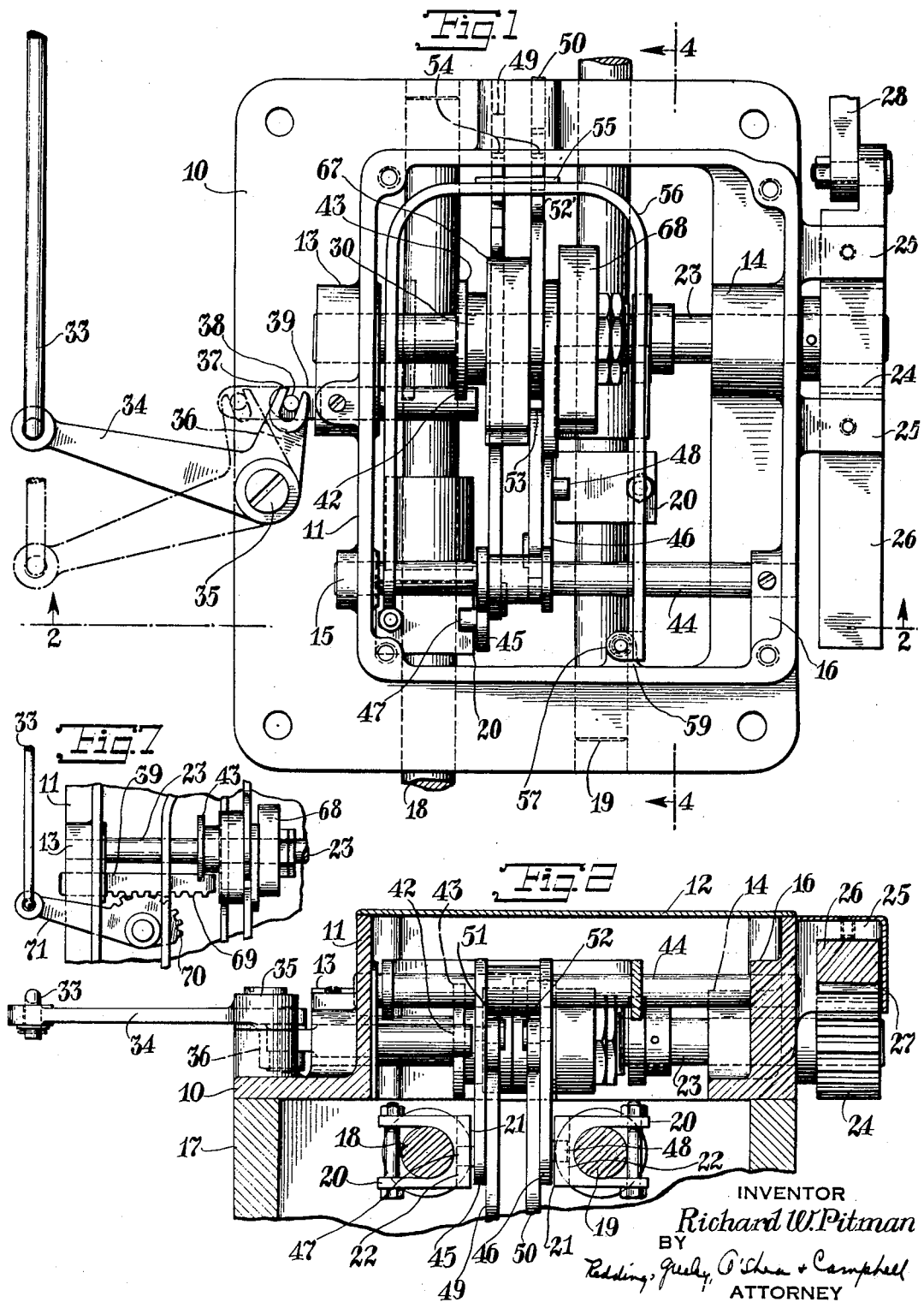

Sept. 19, 1933.   R. W. PITMAN   1,927,789
CONTROLLING AND ACTUATING MECHANISM FOR MOTOR VEHICLE TRANSMISSIONS
Filed Jan. 13, 1932   2 Sheets-Sheet 2
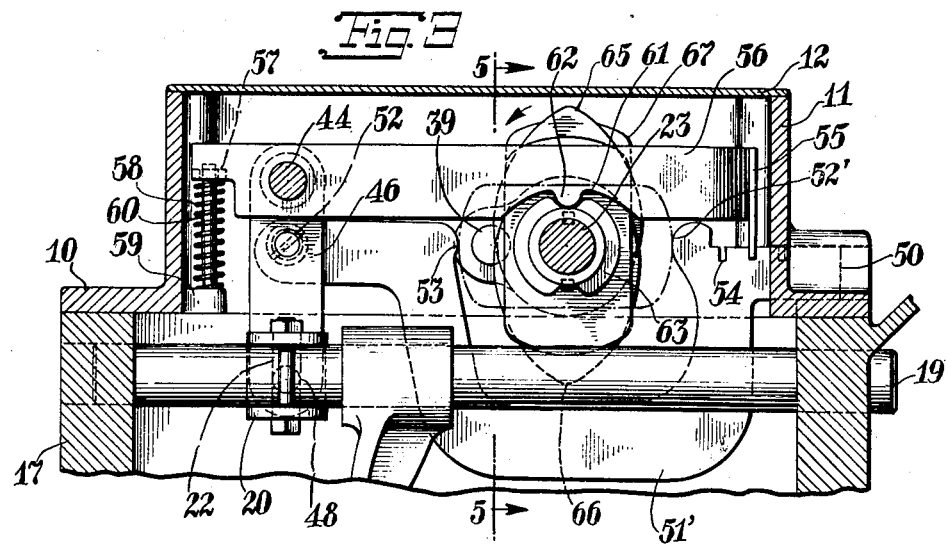
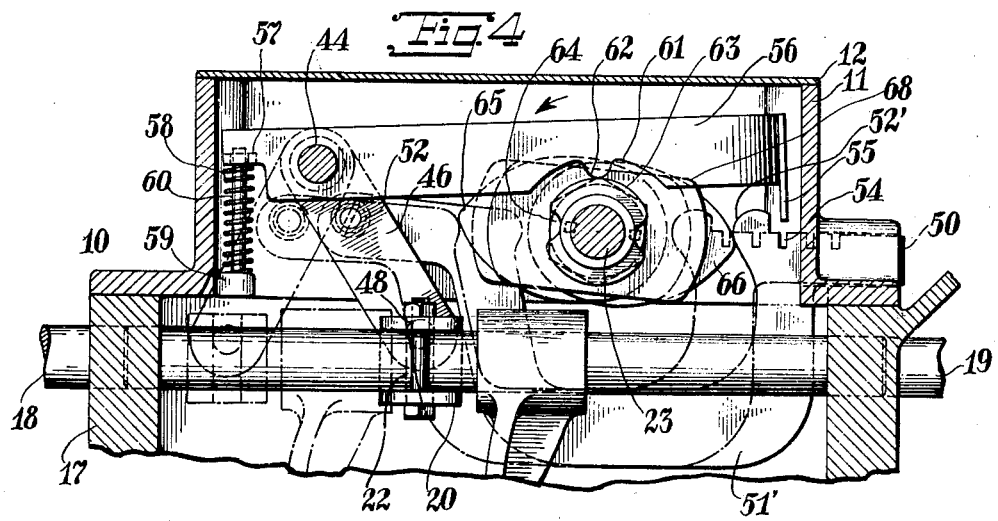
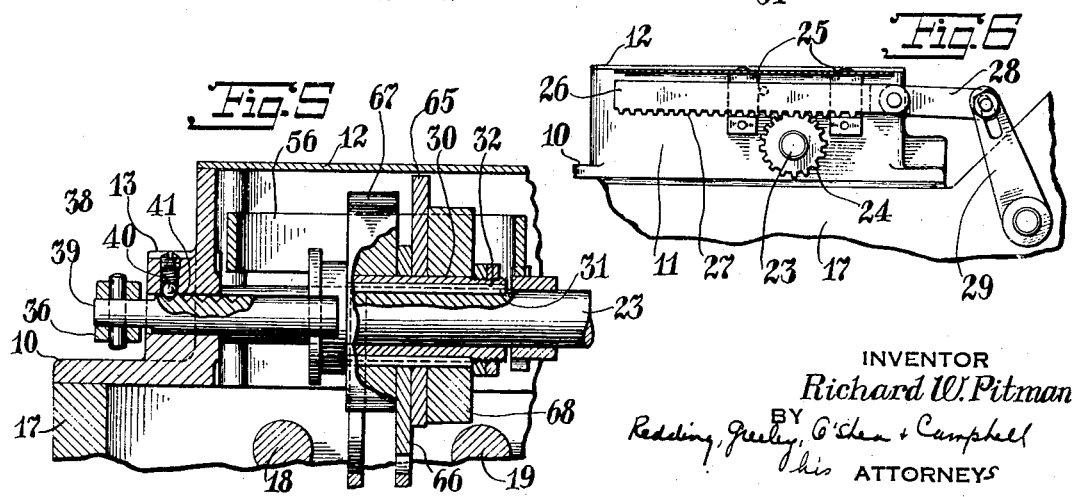
INVENTOR
Richard W. Pitman
BY
Redding, Greeley, O'Shea & Campbell
his ATTORNEYS Patented Sept. 19, 1933

1,927,789

UNITED STATES PATENT OFFICE 1,927,789

CONTROLLING AND ACTUATING MECHANISM FOR MOTOR VEHICLE TRANSMISSIONS

Richard W. Pitman, Westfield, N. J., assignor to Auto-Shift Corporation, New York, N. Y., a corporation of New York Application January 13, 1932. Serial No. 586,307

2 Claims. (Cl. 74—58)

The present invention relates to the devices for controlling the operation of motor vehicle transmissions and embodies, more specifically, an improved selecting and actuating means therefor whereby a desired gear change may be selected and effected automatically by the actuation of the motor vehicle clutch pedal which is actuated in accordance with the standard practice upon a change of gears. More specifically, the invention embodies a mechanism for selecting desired gear change at any time prior to the time of actual shifting and perfecting the shifting operation which has been selected by the movement of the clutch pedal to disengage the clutch. In this connection, the invention contemplates providing a means for effecting the actuation of the shifting mechanism for the gears upon movement of the clutch pedal in either direction, thus permitting a selection to be made while the clutch pedal is depressed and the subsequent shifting operation to be effected upon release of the clutch pedal.

The invention further contemplates the provision of a suitable locking mechanism whereby the gears will be locked positively in any position to which they have been shifted. In this connection, the locking mechanism is automatically actuated by the shifting mechanism whereby the former is rendered inoperative upon actuation of the latter.

A further object of the invention is to provide a selecting and shifting mechanism of the above character wherein the design and number of parts is greatly simplified and reduced to facilitate the manufacture, assembly and maintenance thereof, the elements being so constructed as to insure a positive operation of the device upon actuation thereof.

Further objects, not specifically enumerated above, will be apparent as the invention is described in greater detail in connection with the accompanying drawings, wherein:

Figure 1 is a plan view of a device constructed in accordance with the present invention and mounted in a housing the cover plate of which has been removed in the interest of clearness.

Figure 2 is a view in section, taken on line 2—2 of Figure 1, and looking in the direction of the arrows.

Figure 3 is a view in section, taken on line 4—4 of Figure 1, and looking in the direction of the arrows, this view showing the locking mechanism in its locking position.

Figure 4 is a view in section, taken on line 4—4 of Figure 1, and looking in the direction of the arrows this view being similar to Figure 3, and showing the shifting mechanism moved to a shifted position and the locking mechanism release.

Figure 5 is a view in section, taken on line 5—5 of Figure 3, and looking in the direction of the arrows.

Figure 6 is a view in side elevation, showing the means for supplying power to the shifting mechanism.

Figure 7 is a plan view showing a modified form of selecting mechanism.

Referring to the above drawings, the present invention is preferably mounted upon a plate 10 which is adapted to be secured to a standard transmission to replace the cover thereof. This plate is formed with a housing 11 upon which a cover plate 12 is secured in any well known fashion. The housing 11 is preferably formed of rectangular shape and provided with spaced bearings 13 and 14, and 15 and 16. A transmission mechanism upon which the invention is adapted to be used is illustrated at 17 and includes shifter rods 18 and 19 in accordance with standard practice. These shifter rods are provided with clamps 20, in the adjacent faces 21 of which are formed vertical grooves 22.

In the bearings 13 and 14, a shaft 23 is journaled. This shaft is provided with a gear 24 which is mounted in an overhanging fashion upon an extension of the shaft 23 outside of the housing 11 and affords a means for transmitting power to the shaft to effect the rotation thereof. In suitably spaced brackets 25, mounted upon the housing 11, a rack 26 is slidably mounted, the rack being formed with teeth 27 which are adapted to engage the teeth of gear 24. Rack 26 is connected to a link 28 which may be suitably connected to a lever 29 or other element which is movable with the clutch pedal. It will thus be seen that movement of the clutch pedal effects the rotation of shaft 23.

Upon shaft 23 (as seen particularly in Figure 5) is mounted a sleeve 30, a keyway or keyways 31 being formed in the shaft 23 to receive a key or keys 32 secured to the sleeve 30 to constrain the movement of sleeve 30 with respect to shaft 23 to axial movement and thus prevent relative rotation therebetween. Such axial movement of sleeve 30 is effected by means of a link 33 which is connected to a bell crank lever 34 pivoted at 35 upon the plate 10. The short arm 36 of lever 34 is formed with a bifurcation 37 which is adapted to receive a pin 38 mounted upon a shaft 39 which is slidable axially in the bearing 13. An adjustable spring-pressed ball or detent 40 mounted in the bearing 13, is adapted to engage notches 41 which are formed in the shaft 39 and thus hold the shaft 39 in any predetermined axial position to which it has been moved. The shaft 39 is formed with a groove 42 which engages a flange 43, formed upon the sleeve 30. Axial movement of the shaft 39 thus causes a corresponding movement of the sleeve 30 to select the operating position thereof prior to rotation of shaft 23 to perfect the shifting operation.

A shaft 44 is mounted in the bearings 15 and 16 and suspension links 45 and 46. Link 45 is formed with a pin 47 which is adapted to engage slot 22 formed in the clamp 20 carried by shifter rod 18, while link 46 is formed with a pin 48 which engages the corresponding slot in the bracket carried by shifter rod 19.

The links 45 and 46 are actuated by bars 49 and 50, respectively, these bars being pivoted to the links at 51 and 52, respectively, and slidably mounted at the other ends thereof in the opposite wall of housing 11. As seen in Figures 3 and 4, the bars are formed with offset portions 51', in the adjacent upper extremities of which are formed cammed surfaces 52' and 53. Within the space between the surfaces 52' and 53 and the offset portions 51', the shaft 23 and actuating mechanism carried thereby is adapted to be received. Axial movement of bars 49 and 50 is thus permitted without disturbing the position of the shaft 23.

Spaced notches 54 are formed in the bars 49 and 50 and are adapted to be engaged by a locking plate 55 which is mounted upon a U-shaped lever 56 which is journaled upon the shaft 44. One end of lever 56 is formed with an offset portion or ear 57 against which a spring 58 is adapted to engage, the other end of spring 58 being seated upon an ear 59 formed in the housing 11. To position the spring properly a bar 60 is seated upon the ear 59 and is slidably received within the ear 57. The lever 56 is thus normally urged into a locking position by the spring 58. One side of the lever 56 is formed with a recessed portion 61 having a cam surface 62 which is adapted to be engaged by a cam disc 63, keyed to the shaft 23. The cam disc is formed with diametrically opposed recesses 64 which are adapted to receive the cam surface 62 and thus permit the lever 56 to be moved into its locking position when the shaft 23 is in non-shifting position. Upon initial movement of shaft 23 to effect a shifting operation, the cam disc 63 engages cam surface 62 to release the locking mechanism.

Upon the shifting shaft 23, operating cams 65 and 66 are secured, these cams being adapted to engage with the cam surfaces formed in bars 49 and 50. Cam 66 is adapted to engage the right-hand cam surface 52' of the bars 49 and 50, while cam 65 is adapted to engage the left-hand camming surface 53 of these bars.

In as much as the device is to function upon either the engagement or disengagement of the clutch by suitable movement of the clutch pedal, the cams 65 and 66 pass through an arc of 180° in actuating the bars. The arc through which cam 65 passes lies to the left of a line drawn vertically through the axis of shaft 23, as viewed in Figure 3, while the arc through which cam 66 moves lies to the right of such vertical line. If the clutch pedal has been depressed, cam 66 lies below the shaft 23, while cam 65 lies above the same and the release of the clutch pedal causes cam 66 to move upwardly to its position, as shown in Figure 3, such movement occurring upon the right hand side of the axis of shaft 23, as illustrated in Figure 4.

Centering cams 67 and 68 are secured to the sleeve 30 and serve to return the gears to neutral upon a proper manipulation of shaft 23. From an inspection of Figures 1 and 5, it will be seen that only one of cams 65 and 66 may engage a shifter bar 49 and 50 at a time, the other shifter bar being locked from simultaneous movement by the cams 67 and 68 prior to the shifting operation. The locking plate 55 is elevated to permit a desired shift to be effected, locking the gears in a shifted position after the shifting operation.

In Figure 7, the shaft 39 is formed with teeth 69 which are engaged by the teeth of a segment 70. This segment is formed with an arm 71 which corresponds to the arm 34 and axial movement of the sleeve is thus readily effected. The specific form of the selecting mechanism may be varied extensively as long as a suitable mechanical connection is afforded whereby the shaft 23 may be rotated by actuation of the clutch pedal. For example, cams may be secured directly to the shaft 23 and the latter may be shifted bodily, a suitable splined connection being provided between the gear 24 and shaft 23.

While the invention has been described with specific reference to the accompanying drawings, it is not to be limited, save as defined in the appended claims.

I claim as my invention:

1. In combination with a shifter rod of a transmission mechanism, a selecting means and a shifting means, a rotatable shaft, means to rotate the shaft by the shifting means, means on the shaft to actuate the shifter rod, means to position the last named means with respect to the shifter rod by the selecting means, a locking arm pivoted upon an axis parallel to the shaft, and means on the shaft to disengage the arm from its locking position.

2. In combination with a shifter rod of a transmission mechanism, a selecting means and a shifting means, a rotatable shaft, means to rotate the shaft by the shifting means, means on the shaft to actuate the shifter rod, means to position the last named means with respect to the shifter rod by the selecting means, a locking arm pivoted upon an axis parallel to the shaft, means to urge the arm into locking position, and a cam on the shaft to engage the arm and effect the actuation thereof.

RICHARD W. PITMAN.